(12) United States Patent
Yu et al.

(10) Patent No.: US 10,772,131 B2
(45) Date of Patent: Sep. 8, 2020

(54) APPARATUS AND METHOD FOR RANDOM ACCESS IN WIRELESS COMMUNICATION SYSTEM USING BEAMFORMING

(71) Applicant: Samsung Electronics Co., Ltd, Suwon-si (KR)

(72) Inventors: Hyun-Kyu Yu, Suwon-si (KR); Tae-Young Kim, Seongnam-si (KR); Jeong-Ho Park, Seoul (KR); Su-Ryong Jeong, Yongin-si (KR); Joon-Young Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/120,012

(22) Filed: Aug. 31, 2018

(65) Prior Publication Data

US 2018/0376513 A1    Dec. 27, 2018

Related U.S. Application Data

(63) Continuation of application No. 13/935,450, filed on Jul. 3, 2013, now Pat. No. 10,091,820.

(30) Foreign Application Priority Data

Jul. 3, 2012  (KR) ........................ 10-2012-0072431

(51) Int. Cl.
*H04Q 1/20* (2006.01)
*H04W 72/04* (2009.01)
(Continued)

(52) U.S. Cl.
CPC ...... *H04W 74/0833* (2013.01); *H04B 7/0695* (2013.01); *H04W 74/004* (2013.01)

(58) Field of Classification Search
CPC ........... H04W 74/0833; H04W 72/085; H04W 74/08; H04W 16/28; H04W 74/004;
(Continued)

(56) References Cited

U.S. PATENT DOCUMENTS 9,001,754 B2    4/2015  Kato et al.
2003/0076812 A1*  4/2003  Benedittis ........... H04W 74/002
                                                    370/350
(Continued)

FOREIGN PATENT DOCUMENTS

CN    101444137 A    5/2009
CN    101472346 A    7/2009
(Continued)

OTHER PUBLICATIONS

Office Action dated Nov. 26, 2018 in connection with India Patent Application No. 2701/KOLNP/2014, 6 pages.
(Continued)

*Primary Examiner* — Edan Orgad
*Assistant Examiner* — Vanneilian Lalchinthang

(57) ABSTRACT

An apparatus implements methods for random access in a wireless communication system using beamforming. A Subscriber Station (SS) measures a best downlink transmission beam among downlink transmission beams transmitted from a Base Station (BS), and transmits Random Access Channel (RACH) information, which includes indication information indicating the best downlink transmission beam, to the BS. The BS receives RACH information which includes indication information indicating a best downlink transmission beam among downlink transmission beams, and detects an RACH sequence and the best downlink transmission beam from the received RACH information.

17 Claims, 15 Drawing Sheets

(51) Int. Cl.
*H04W 74/08* (2009.01)
*H04W 74/00* (2009.01)
*H04B 7/06* (2006.01)

(58) Field of Classification Search
CPC .... H04W 16/14; H04W 56/00; H04B 7/0695; H04B 1/005; H04B 1/1027
USPC ......................................................... 370/329
See application file for complete search history.

(56) References Cited

U.S. PATENT DOCUMENTS

| | | | |
|---|---|---|---|
| 2006/0030365 | A1 | 2/2006 | Hovers et al. |
| 2006/0252377 | A1* | 11/2006 | Jeong .................... H04W 24/10 455/67.13 |
| 2007/0165567 | A1 | 7/2007 | Tan et al. |
| 2008/0225785 | A1* | 9/2008 | Wang .................. H04W 74/002 370/329 |
| 2008/0273610 | A1* | 11/2008 | Malladi ................. H04L 1/0029 375/260 |
| 2009/0170514 | A1* | 7/2009 | Yokoyama .......... H04W 72/085 455/436 |
| 2011/0007721 | A1 | 1/2011 | Taghavi Nasrabadi et al. |
| 2011/0222492 | A1 | 9/2011 | Borsella et al. |
| 2011/0244907 | A1 | 10/2011 | Golaup et al. |
| 2011/0310940 | A1 | 12/2011 | Ozluturk |
| 2012/0052897 | A1* | 3/2012 | Senarath ............... H04W 16/02 455/509 |
| 2012/0214525 | A1* | 8/2012 | Fujii ...................... H04B 1/005 455/502 |
| 2013/0208684 | A1 | 8/2013 | Ozluturk |
| 2015/0359006 | A1 | 12/2015 | Ozluturk |

FOREIGN PATENT DOCUMENTS

| | | |
|---|---|---|
| EP | 1720373 A1 | 11/2006 |
| EP | 2076087 A2 | 7/2009 |
| JP | 2009-159214 A | 7/2009 |
| JP | 2009-536806 A | 10/2009 |
| JP | 2011-040822 A | 2/2011 |
| KR | 10-2008-0045601 A | 5/2008 |
| KR | 10-2011-0124129 A | 11/2011 |
| RU | 2278471 C2 | 6/2006 |
| WO | 2007/133652 A2 | 11/2007 |

OTHER PUBLICATIONS

Office Action dated Sep. 3, 2018 in connection with Korean Patent Application No. 10-2012-0072431, 11 pages.
Notice of Grant dated Apr. 1, 2019 in connection with Korean Patent Application No. 10-2012-0072431, 4 pages.
Foreign Communication From a Related Counterpart Application, Chinese Application No. 201380035112.4, Text of the First Office Action dated Jan. 11, 2017, 21 pages.
ForeignCommunication From a Related Counterpart Application, European Application 13813473.9-1857, Communication Pursuant to Article 94(3) EPC dated Mar. 28, 2017, 6 pages.
Office Action dated Oct. 26, 2017 in connection with European Patent Application No. 13 813 473.9.
Decision on Grant dated Jul. 22, 2016 in connection with Russian Application No. 2014153522, 18 pages.
Extended European Search Report dated Feb. 16, 2016 in connection with European Application No. 13813473.9, 8 pages.
Notice of Preliminary Rejection dated Jan. 25, 2016 in connection with Japanese Application No. 2015-250059, 11 pages.
Office Action dated Mar. 4, 2016 in connection with Russian Application No. 2014153522; 15 pages.
Patent Examination Report No. 2 dated Apr. 6, 2016 in connection wtih Australian Application 2013285774, 3 pages.
Patent Examination Report No. 1 dated Jun. 24, 2015 in connection with Australian Patent Application No. 2013285774; 3 pages.
International Search Report dated Oct. 24, 2013 in connection with International Patent Application No. PCT/KR2013/005909.
Written Opinion of the International Searching Authority dated Oct. 24, 2013 in connection with International Patent Application No. PCT/KR2013/005909.
Office Action dated Jan. 30, 2015 in connection with U.S. Appl. No. 13/935,450.
Office Action dated Jul. 8, 2015 in connection with U.S. Appl. No. 13/935,450.
Office Action dated Jan. 15, 2016 in connection with U.S. Appl. No. 13/935,450.
Office Action dated Aug. 18, 2016 in connection with U.S. Appl. No. 13/935,450.
Office Action dated Mar. 10, 2017 in connection with U.S. Appl. No. 13/935,450.
Office Action dated Dec. 19, 2017 in connection with U.S. Appl. No. 13/935,450.

* cited by examiner

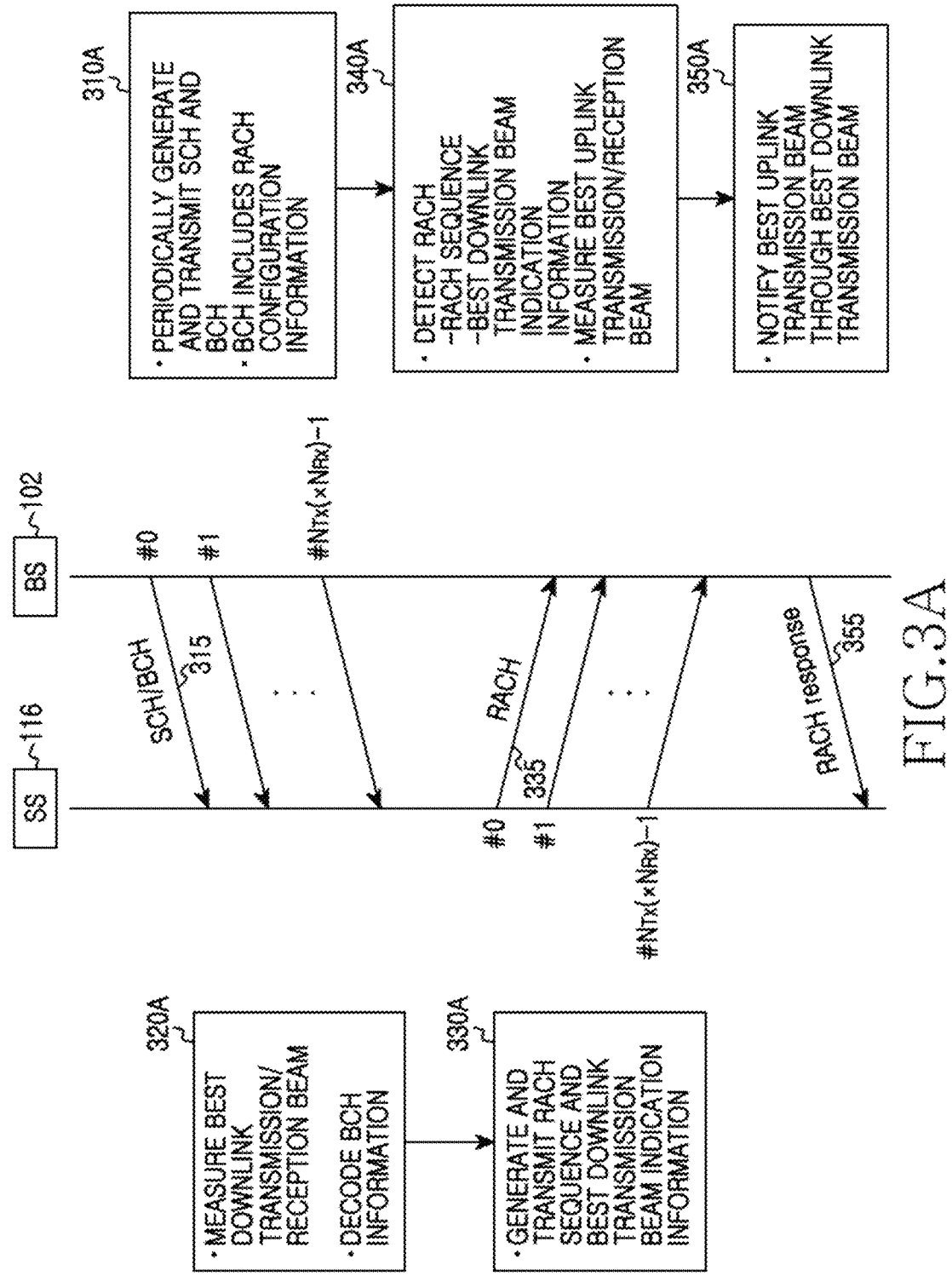

APPARATUS AND METHOD FOR RANDOM ACCESS IN WIRELESS COMMUNICATION SYSTEM USING BEAMFORMING

CROSS-REFERENCE TO RELATED APPLICATIONS

The present application is a continuation of U.S. patent application Ser. No. 13/935,450 filed on Jul. 3, 2013, which claims priority under 35 U.S.C. § 119(a) to Korean Patent Application No. 10-2012-0072431 filed on Jul. 3, 2012 in the Korean Intellectual Property Office, the disclosures of which are herein incorporated by reference in their entirety.

BACKGROUND

1. Field

The present disclosure relates to a wireless communication system. More particularly, the present disclosure relates to an apparatus and method for transmission and reception of a random access channel.

2. Description of Related Art

To meet the ever-increasing demand of wireless data traffic, a wireless communication system is developing for supporting a higher data transfer rate. To increase the data transfer rate, a 4th-Generation (4G) system currently launching commercialization sought technology development in the direction of primarily improving spectral efficiency. But, it is not easy to meet the explosive demand of wireless data traffic by only the spectral efficiency improvement technology.

As one way for meeting the demand of wireless data traffic, a way using a very wide frequency band can be taken into consideration. Because a frequency band currently used in a mobile communication cellular system is generally 10 Giga Hertz (GHz) or less, there is a great difficulty in securing a wide frequency band. Therefore, there is a need to secure a broadband frequency at a higher frequency band. For example, to secure the wide frequency band, a millimeter (mm) wave system is being proposed. But, as frequency for wireless communication gets higher, propagation path loss increases. As a result, propagation distance decreases relatively and thus, service coverage decreases. A beamforming technology is emerging as one of the technologies for mitigating propagation path loss and increasing propagation distance.

The beamforming technology needs a beam selection technology of accurately measuring transmission and reception (Tx/Rx) beams of a Base Station (BS) and of a Subscriber Station (SS) and reporting the most suitable beams. The beamforming technology and the corresponding beam selection technology are required not merely after network entry, but also at the time of the network entry process. Accordingly, structures of a synchronization channel used in the network entry process, a broadcast channel, a random access channel, and the like have should be capable of supporting efficient beamforming technology and beam selection process.

SUMMARY

To address the above-discussed deficiencies, embodiments of the present disclosure provide a random access channel apparatus and a corresponding signal transmission/reception method capable of effectively supporting a beam selection process in a wireless communication system using beamforming.

Certain embodiments of the present disclosure include an apparatus and method for transmitting/receiving information about a best beam at the time of network entry process in a wireless communication system using beamforming.

Certain embodiments of the present disclosure include an apparatus and method for transmitting information about best downlink transmission beam through a random access channel in a wireless communication system using beamforming.

Certain embodiments of the present disclosure include an apparatus and method for receiving a random access channel and detecting information about a best downlink transmission beam in a wireless communication system using beamforming.

The above embodiments are achieved by providing an apparatus and method for random access in a wireless communication system using beamforming.

Certain embodiments of the present disclosure include a method of a Subscriber Station (SS) in a wireless communication system using beamforming. The method includes measuring a best downlink transmission beam among downlink transmission beams transmitted from a Base Station (BS), and transmitting Random Access Channel (RACH) information, which includes indication information indicating the best downlink transmission beam, to the BS.

Certain embodiments of the present disclosure include a SS apparatus in a wireless communication system using beamforming. The apparatus includes a RACH information generator and a transmitter. The RACH information generator generates RACH information which includes indication information indicating a best downlink transmission beam among downlink transmission beams transmitted from a BS. The transmitter transmits the generated RACH information to the BS.

Certain embodiments of the present disclosure include a method of a BS in a wireless communication system using beamforming. The method includes receiving RACH information which includes indication information indicating a best downlink transmission beam among downlink transmission beams transmitted to a SS from the BS, and detecting a RACH sequence and the best downlink transmission beam from the received RACH information.

Certain embodiments of the present disclosure include a BS apparatus in a wireless communication system using beamforming. The apparatus includes a receiver and a detector. The receiver receives RACH information which includes indication information indicating a best downlink transmission beam among downlink transmission beams transmitted to a SS from the BS. The detector detects an RACH sequence and the best downlink transmission beam from the received RACH information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3A and 3B illustrate a procedure for a network entry process between a BS and a SS according to embodiments of the present disclosure;

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Embodiments of the present disclosure will be described herein below with reference to the accompanying drawings. In describing the embodiments of the present disclosure, a number of specific details will be described, but it will be obvious to those skilled in the art that the present disclosure can be carried out even without these specific details. Also, it should be noted that well known methods, procedures, components, circuit networks, and the like are not described in detail in describing the embodiments of the present disclosure.

Embodiments of the present disclosure relate to provision of a random access channel transmission/reception apparatus and method capable of supporting a beam selection process in a wireless communication system using beamforming. The beamforming can be divided into transmission beamforming carried out in a transmit end and reception beamforming carried out in a receive end. The transmission beamforming generally concentrates the range of radio waves into a specific direction by using a plurality of antennas, increasing directivity. In an certain embodiments, a form of a set of the plurality of antennas can be an antenna array, and each antenna included in the antenna array can be an array element. The antenna array can be constructed in various forms such as a linear array, a planar array, etc. The use of the transmission beamforming increases signal directivity, increasing a transmission distance. Further, a signal is not almost transmitted in directions other than a directed direction, signal interference in other receive ends is greatly decreased. By using a reception antenna array, the receive end can perform the reception beamforming for a receive signal. The reception beamforming concentrates reception of radio waves into a specific direction to increase the sensitivity of a receive signal being input in a corresponding direction. And, the reception beamforming excludes signals being input in directions other than the corresponding direction from the receive signal to provide a gain of cutting off an interference signal.

According to embodiments of the present disclosure to be described below, a Subscriber Station (SS) transmits information about a best downlink transmission beam through a random access channel, and a Base Station (BS) receives the random access channel to detect a Random Access CHannel (RACH) sequence and the best downlink transmission beam.

Figure 1:
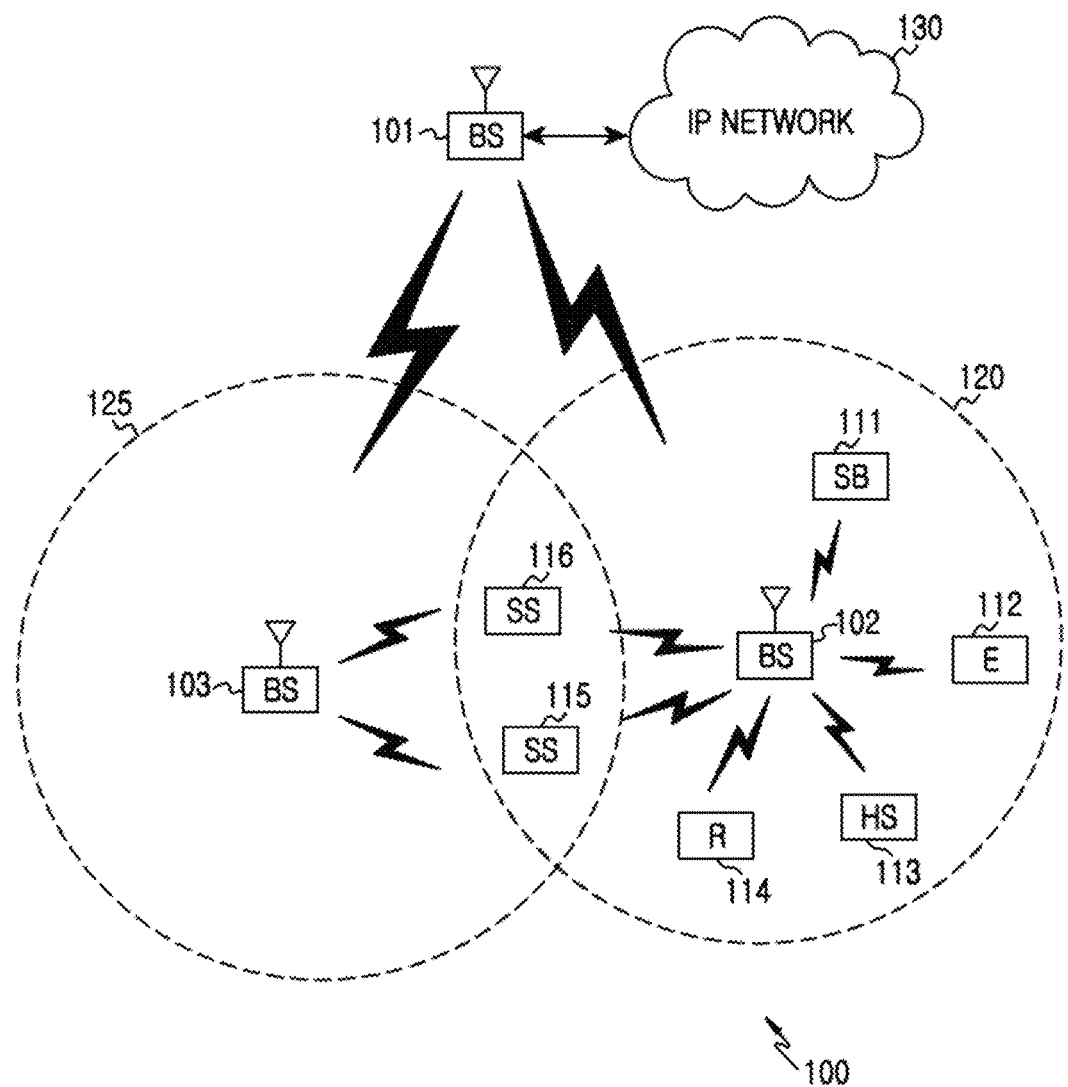
FIG. 1 illustrates a wireless network to which embodiments of the present disclosure are applied.

FIG. 1 illustrates an example of a wireless network 100 to which embodiments of the present disclosure are applied. In the embodiment illustrated, the wireless network 100 includes a BS 101, a BS 102, a BS 103, and other like BSs (not shown). The BS 101 is communicating with the BS 102 and the BS 103. The BS 101 is also communicating with the Internet 103 or a similar Internet Protocol (IP)-based network (not shown).

The BS 102 provides a wireless broadband access to the Internet 130 (through the BS 101), to a plurality of first SSs which are within the coverage 120 of the BS 102. The plurality of first SSs include SS 111 which may be located in a small Business (SB), SS 112 which may be located in an Enterprise (E), SS 113 which may be located in a Wireless Fidelity (WiFi) HotSpot (HS), SS 114 which may be located in a first Residence (R), SS 115 which may be located in a second Residence (R), and SS 116 which may be a Mobile device (M) including a cell phone, a wireless laptop, a wireless Personal Digital Assistant (PDA) and other like.

The BS 103 provides a wireless broadband access to the Internet 130 (through the BS 101), to a plurality of second SSs being within the coverage 125 of the BS 103. The plurality of second SSs include the SS 115 and the SS 116. In certain embodiments, by using an Orthogonal Frequency Division Multiplexing (OFDM) or Orthogonal Frequency Division Multiple Access (OFDMA) technique, the BSs 101 to 103 communicate with one another and communicate with the SSs 111 to 116.

The BS 101 communicates with more BSs or with less BSs. Further, it should be understood that, although FIG. 1 illustrates only six SSs, the wireless network 100 provides a wireless broadband access to additional SSs. The SS 115 and the SS 116 are located at a boundary portion between the coverage 120 and the coverage 125. The SS 115 and the SS 116 communicate with the BS 102 and the BS 103, and operate in a handoff mode.

The SSs 111 to 116 have access to voice, data, video, video conference, or other broadband services through the Internet 130. In certain embodiments, one or more SSs 111 to 116 are associated with an Access Point (AP) of a WiFi Wireless Local Area Network (WLAN). The SS 116 can be a laptop computer with wireless communication capabilities, a personal data assistant, a notebook computer, a handheld device, or any of a plurality of mobile terminals including other devices with wireless communication capabilities. For example, the SS 114 or 115 can be a Personal Computer (PC) enabled by wireless communication capabilities, a laptop computer, a gateway or other devices.

Figure 2A:
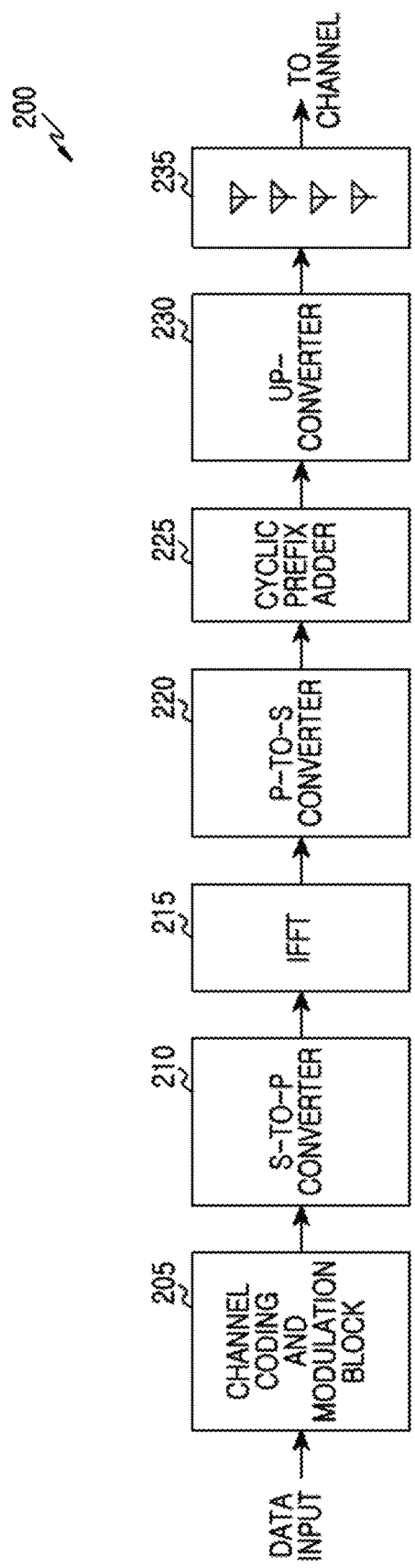
FIG. 2A illustrates a high level diagram of an Orthogonal Frequency Division Multiple Access (OFDMA) transmission path of a Base Station (BS) and of a Subscriber Station (SS) of FIG. 1 in an OFDMA scheme.
Figure 2B:
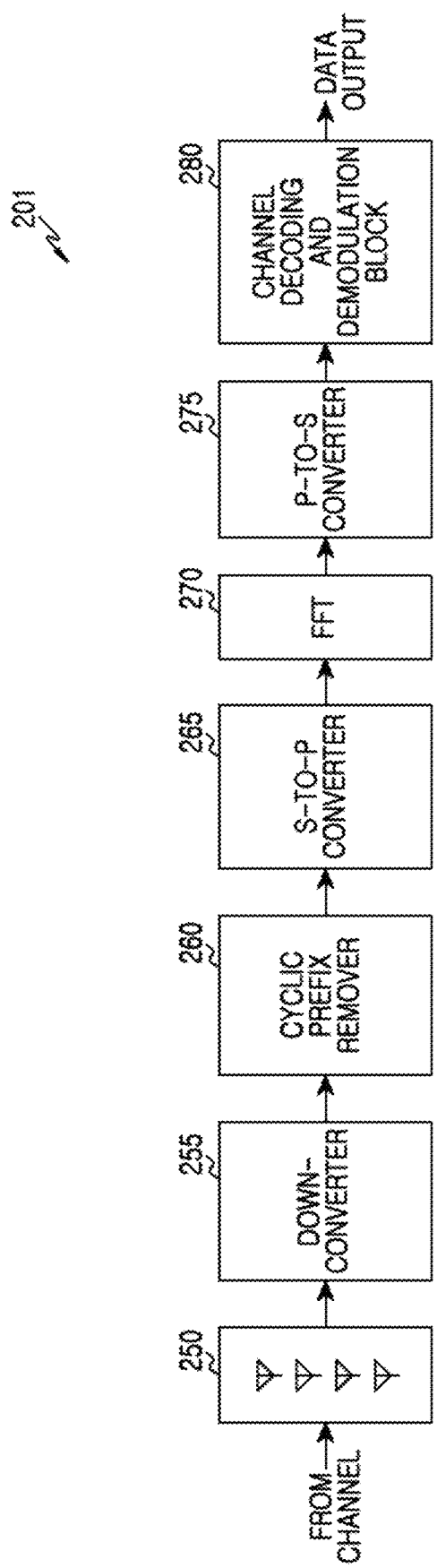
FIG. 2B illustrates a high level diagram of an OFDMA reception path of a BS and of a SS of FIG. 1 in an OFDMA scheme.

FIG. 2A illustrates a high level diagram of an OFDMA transmission path 200 of a BS and a SS of FIG. 1 in an OFDMA scheme. FIG. 2B illustrates a high level diagram of an OFDMA reception path 201 of the BS and the SS of FIG. 1 in the OFDMA scheme. Illustrated in FIGS. 2A and 2B is an example in which the OFDMA transmission path 200 is realized in the BS 102 and the SS 116, and the OFDMA reception path 201 is realized in the BS 102 and the SS 116. For convenience, descriptions within the present disclosure will be made for an example in which the OFDMA transmission path 200 is realized in the BS 102, and the OFDMA reception path 201 is realized in the SS 116. But, it will be understood by those skilled in the art that the OFDMA transmission path 200 and the OFDMA reception path 201 can be realized in the other BSs 101 and 103 and the other SSs 111 to 115 of FIG. 1.

The OFDMA transmission path 200 of the BS 102 includes a channel coding and modulation block 205, a Serial-to-Parallel (S-to-P) converter 210, an Inverse Fast Fourier Transform (IFFT) block 215 of a size 'N', a Parallel-to-Serial (P-to-S) converter 220, a cyclic prefix adder 225, an Up-Converter (UC) 230, and an antenna unit 235. The OFDMA reception path 201 of the SS 116 includes an antenna unit 250, a Down-Converter (DC) 255, a cyclic prefix remover 260, a serial-to-parallel converter 265, a Fast Fourier Transform (FFT) block 270 of a size 'N', a parallel-to-serial converter 275, and a channel decoding and demodulation block 280.

In FIGS. 2A and 2B, at least some constituent elements can be software, and other constituent elements can be implemented as configurable hardware or software and a combination of configurable hardware. Particularly, the FFT block 270 and the IFFT block 215 described in this disclosure document can be implemented as configurable software algorithms according to embodiments of the present disclosure. Herein, a value of the size 'N' can be modified according to suit the implementation.

In the BS 102, the channel coding and modulation block 205 receives a set of information bits, applies coding (e.g., Low Density Parity Check (LDPC) coding) to the information bits, processes the information bits by modulation (e.g., Quadrature Phase Shift Keying (QPSK) or Quadrature Amplitude Modulation (QAM) modulation), and generates a sequence of frequency domain modulation symbols. The serial-to-parallel converter 210 converts, that is, demultiplexes the serial modulated symbols into parallel data, and generates N-parallel symbol streams. Herein, the 'N' is an IFFT/FFT size used in the BS 102 and the SS 116. The IFFT block 215 of the size 'N' performs an IFFT operation for the N-parallel symbol streams and generates time domain output signals. The parallel-to-serial converter 220 converts (i.e., multiplexes) time domain parallel output symbols from the IFFT block 215 of the size 'N', and generates a time domain serial signal. The cyclic prefix adder 225 inserts a cyclic prefix code into the time domain serial signal. The up-converter 230 modulates, that is, up converts an output of the cyclic prefix adder 225 into an RF frequency for transmitting through a wireless channel. In certain embodiments, the signal is filtered in a baseband before being converted into the RF frequency in the up-converter 230. The antenna unit 235 has an antenna array structure including a set of a plurality of antennas, and supports the transmission beamforming.

The RF signal transmitted through the antenna unit 235 passes through a wireless channel and then, reaches the SS 116. According to the following description, the SS 116 performs the inverse operations of the operations of the BS 102. The antenna unit 250 includes an antenna array structure including a set of a plurality of antennas, and supports the reception beamforming. The down-converter 255 down converts a received signal into a baseband frequency. The cyclic prefix remover 260 removes a cyclic prefix code and generates a time domain serial baseband signal. The serial-to-parallel converter 265 converts the time domain serial baseband signal into time domain parallel signals. The FFT block 270 of the size 'N' performs an FFT algorithm and generates N—parallel signals on a frequency domain. The parallel-to-serial converter 275 converts the frequency domain parallel signals into a sequence of modulated data symbols. The channel decoding and demodulation block 280 demodulates and then decodes the modulated data symbols to recover the original input data stream.

The BSs 101 to 103 each can include a transmission path 200 similar to transmission in downlink to the SSs 111 to 116 and can include a reception path 201 similar to reception in uplink from the SSs 111 to 116. Similarly, the SSs 111 to 116 each can include a transmission path 200 corresponding to a structure for transmission in uplink to the BSs 101 to 103 and can include a reception path 201 corresponding to a structure for reception in downlink from the BSs 101 to 103.

Figure 3B:
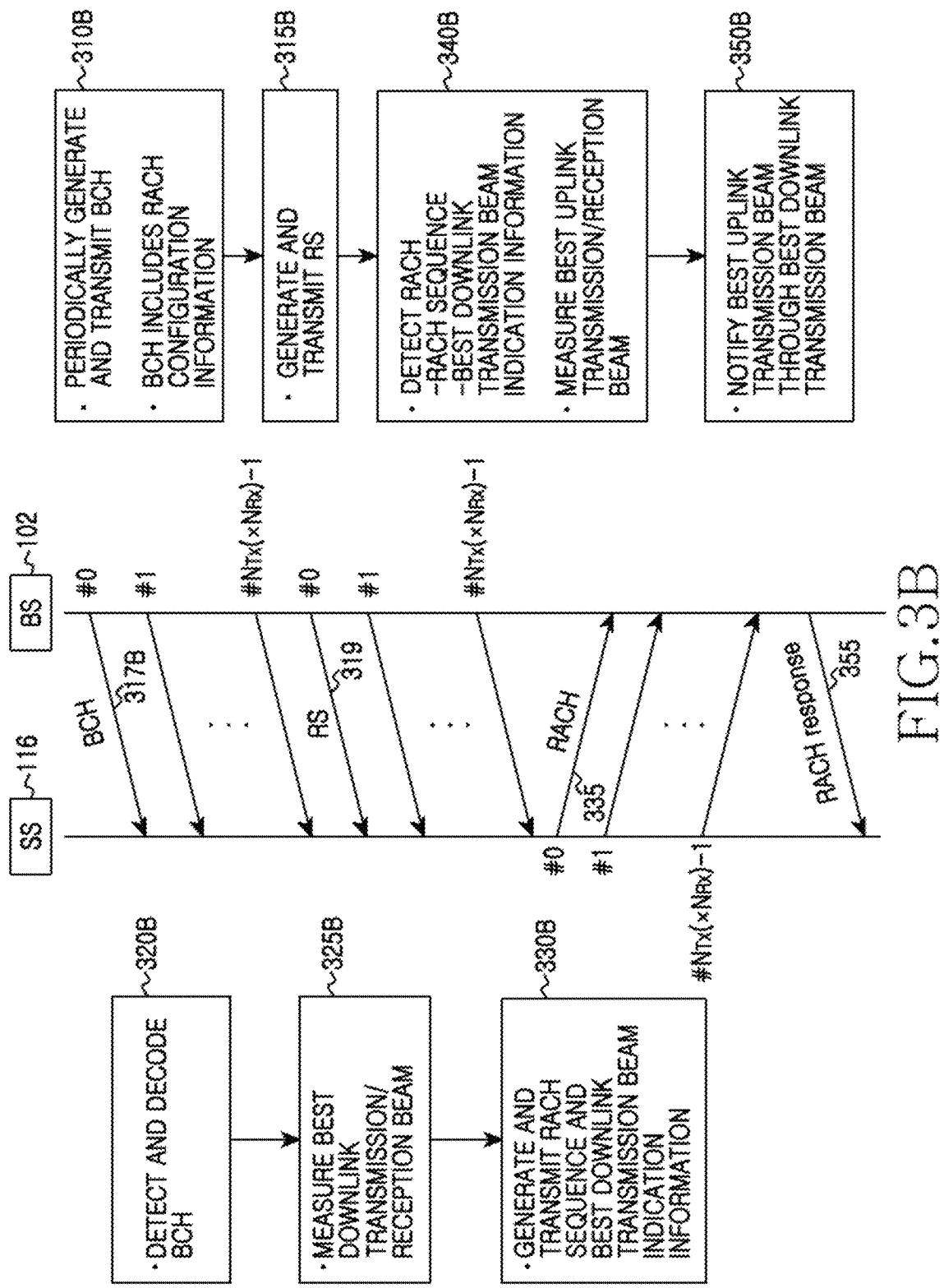

FIGS. 3A and 3B are diagrams exemplifying a procedure for a network entry process between a BS and a SS according to embodiments of the present disclosure. Herein, an example in which the BS 102 and the SS 116 of FIG. 1 using beamforming perform the network entry procedure will be described. But, it should be noted that the operation of the network entry procedure is not limited only between the BS 102 and the SS 116.

Referring to FIG. 3A, in block 310A, the BS 102 periodically generates and transmits a Synchronization CHannel (SCH) as a beam-measurable reference channel and a Broadcast CHannel (BCH) (together referenced by 315). At this time, because the synchronization channel and the broadcast channel 315 are beamformed and transmitted (that is, are transmitted using a beam having a specific beam width), the synchronization channel and the broadcast channel 315 are transmitted several times repeatedly, varying a downlink Transmission (Tx) beam such that the synchronization channel and the broadcast channel are broadcasted to all coverage within a cell. That is, the downlink transmission beam is beam swept. Herein, $N_{Tx}$ is the number of downlink transmission beams ($N_{Tx}>1$), and $N_{Rx}$ is the number of iterative transmission for downlink Reception (Rx) beamforming support ($N_{Rx} \geq 1$). The broadcast channel includes Random Access CHannel (RACH) configuration information. In place of the broadcasting channel, a Medium Access Control (MAC) message of other type broadcasted by the BS 102 can be used.

In block 320A, the SS 116 detects and decodes the synchronization channel and the broadcast channel. Through detection and decoding of the broadcast channel, the SS 116 can identify the RACH configuration information included in the broadcast channel. At the time of synchronization channel detecting and decoding operation, the SS 116 measures and selects a transmission/reception beam pair of the best channel state (Tx and Rx best beam pair), and stores information of a best transmission/reception (Tx/Rx) beam pair. In block 330A, the SS 116 attempts system entry through a random access channel. Even in this process, transmission/reception beamforming is used. The random access channel 335 is transmitted using a beam having a specific beam width, and is transmitted varying a transmission beam in all directions. According to embodiments of the present disclosure, the SS 116 transmits RACH information based on the RACH configuration information transmitted from the BS 102. The RACH information transmitted through the random access channel 335 includes a RACH sequence and indication information indicating a best downlink transmission beam.

According to certain embodiments of the present disclosure, at RACH information transmission operation, the SS 116 selects a specific group of RACH sequences among a plurality of RACH sequences, determines one RACH sequence among the selected specific group of RACH sequences, and transmits the determined RACH sequence as the RACH information. The specific group of RACH sequences can be set to correspond to the indication information.

According to certain embodiments of the present disclosure, at RACH information transmission operation, the SS 116 determines any one RACH sequence among a plurality of RACH sequences, and transmits the determined RACH sequence as the RACH information at an opportunity corresponding to a best downlink transmission beam among a plurality of transmission opportunities.

According to certain embodiments of the present disclosure, at RACH information transmission operation, the SS 116 selects a specific group of RACH sequences among a plurality of RACH sequences, determines one RACH sequence among the selected specific group of RACH sequences, and transmits the determined RACH sequence as the RACH information at an opportunity selected among a plurality of transmission opportunities. The specific group of RACH sequences can be set to correspond to the indication information. Certain embodiments of the present disclosure are a combination of the other embodiments of the present disclosure.

In block 340A, the BS 102 receives the random access channel, and detects the RACH sequence and the best downlink transmission beam indication information from the received random access channel. Also, the BS 102 measures a receive signal and selects a best UpLink (UL) transmission/reception beam. In block 350A, the BS 102 transmits a RACH response message 355 to the SS 116 through the best downlink transmission beam indicated by the detected best downlink transmission beam indication information. In certain embodiments, the RACH response message 355 includes information about the selected best uplink transmission beam.

According to certain embodiments of the present disclosure, at reception of the random access channel 335, the BS 102 detects as many bits as a predefined number among RACH information as an RACH sequence, and detects as the best downlink transmission beam a downlink transmission beam indicated by the remnant bits excepting the RACH sequence among the RACH information.

According to certain embodiments of the present disclosure, at reception of the random access channel 335, the BS 102 detects a sequence included in the RACH information as an RACH sequence, and detects as the best downlink transmission beam a downlink transmission beam corresponding to an opportunity at which the RACH information is received among a plurality of transmission opportunities.

According to certain embodiments of the present disclosure, at reception of the random access channel 335, the BS 102 detects as many bits as a predefined number among RACH information as an RACH sequence, and detects as the best downlink transmission beam a downlink transmission beam which corresponds to the remnant bits excepting the RACH sequence among the RACH information and an opportunity at which the RACH information is received among a plurality of transmission opportunities.

Referring to FIG. 3B, in block 310B, the BS 102 periodically generates and transmits a broadcast channel (BCH) 317. At this time, because the broadcast channel 317 is beamformed and transmitted (that is, transmitted using a beam having a specific beam width), the broadcast channel 317 is transmitted several times repeatedly, varying a downlink transmission beam to be broadcasted to all coverage within a cell. That is, the downlink transmission beam is beam swept. Herein, $N_{Tx}$ is the number of downlink transmission (Tx) beams ($N_{Tx}$>1), and $N_{Rx}$ is the number of iterative transmission for downlink reception (Rx) beamforming support ($N_{Rx} \geq 1$). The broadcast channel includes RACH configuration information. In place of the broadcasting channel 317, a MAC message of other type broadcasted by the BS 102 may be used.

In block 320B, the SS 116 detects and decodes the broadcast channel 317. Through this, the SS 116 can identify the RACH configuration information included in the broadcast channel 317.

In block 315B, the BS 102 periodically generates and transmits a Reference Signal (RS) 319 as a beam-measurable signal. At this time, because the reference signal 319 is beamformed and transmitted (that is, transmitted using a beam having a specific beam width), the reference signal 319 is transmitted several times repeatedly, varying a downlink transmission beam to be broadcasted to all coverage within a cell. That is, the downlink transmission beam is beam swept. Herein, $N_{Tx}$ is the number of downlink transmission (Tx) beams ($N_{Tx}$>1), and $N_{Rx}$ is the number of iterative transmission for downlink reception (Rx) beamforming support ($N_{Rx} \geq 1$).

In block 325B, the SS 116 receives the reference signal 319 to measure a best downlink transmission/reception beam. At the time of this operation, the SS 116 measures and selects a transmission/reception beam pair of the best channel state (Tx and Rx best beam pair), and stores information of a best transmission/reception beam pair. In block 330B, the SS 116 attempts system entry through a random access channel. Even in this process, transmission/reception beamforming is used. The random access channel 335 is transmitted using a beam having a specific beam width, and is transmitted varying a transmission beam in all directions. According to embodiments of the present disclosure, the SS 116 transmits RACH information based on the RACH configuration information transmitted from the BS 102. The RACH information transmitted through the random access channel includes an RACH sequence and indication information indicating a best downlink transmission beam.

According to certain embodiments of the present disclosure, at RACH information transmission operation, the SS 116 selects a specific group of RACH sequences among a plurality of RACH sequences, determines one RACH sequence among the selected specific group of RACH sequences, and transmits the determined RACH sequence as the RACH information. The specific group of RACH sequences can be set to correspond to the indication information.

According to certain embodiments of the present disclosure, at RACH information transmission operation, the SS 116 determines any one RACH sequence among a plurality of RACH sequences, and transmits the determined RACH sequence as the RACH information at an opportunity corresponding to a best downlink transmission beam among a plurality of transmission opportunities.

According to certain embodiments of the present disclosure, at RACH information transmission operation, the SS 116 selects a specific group of RACH sequences among a plurality of RACH sequences, determines one RACH sequence among the selected specific group of RACH sequences, and transmits the determined RACH sequence as the RACH information at an opportunity selected among a plurality of transmission opportunities. The specific group of RACH sequences can be set to correspond to the indication information. Certain embodiments are a combination of other embodiments.

In block 340B, the BS 102 receives a random access channel 335, and detects an RACH sequence and best downlink transmission beam indication information from the received random access channel. Also, the BS 102 measures received signals and the BS 102 selects a best uplink transmission/reception beam. In block 350B, the BS 102 transmits an RACH response message 355 to the SS 116 through the best downlink transmission beam indicated by the detected best downlink transmission beam indication information. In certain embodiments, the RACH response message 355 includes information about the selected best uplink transmission beam.

According to certain embodiments of the present disclosure, in response to receiving (that is, at reception) of the random access channel 335, the BS 102 detects as many bits as a predefined number among RACH information as an RACH sequence, and detects as the best downlink transmission beam a downlink transmission beam indicated by the remnant bits excepting the RACH sequence among the RACH information.

According to certain embodiments of the present disclosure, in response to (that is, at reception) of the random access channel 335, the BS 102 detects a sequence included in the RACH information as an RACH sequence, and detects as the best downlink transmission beam a downlink transmission beam corresponding to an opportunity at which the RACH information is received among a plurality of transmission opportunities.

According to certain embodiments of the present disclosure, at reception of the random access channel 335, the BS 102 detects as many bits as a predefined number among RACH information as an RACH sequence, and detects as the best downlink transmission beam a downlink transmission beam which corresponds to the remnant bits excepting the RACH sequence among the RACH information, and an opportunity at which the RACH information is received among a plurality of transmission opportunities.

Figure 4:
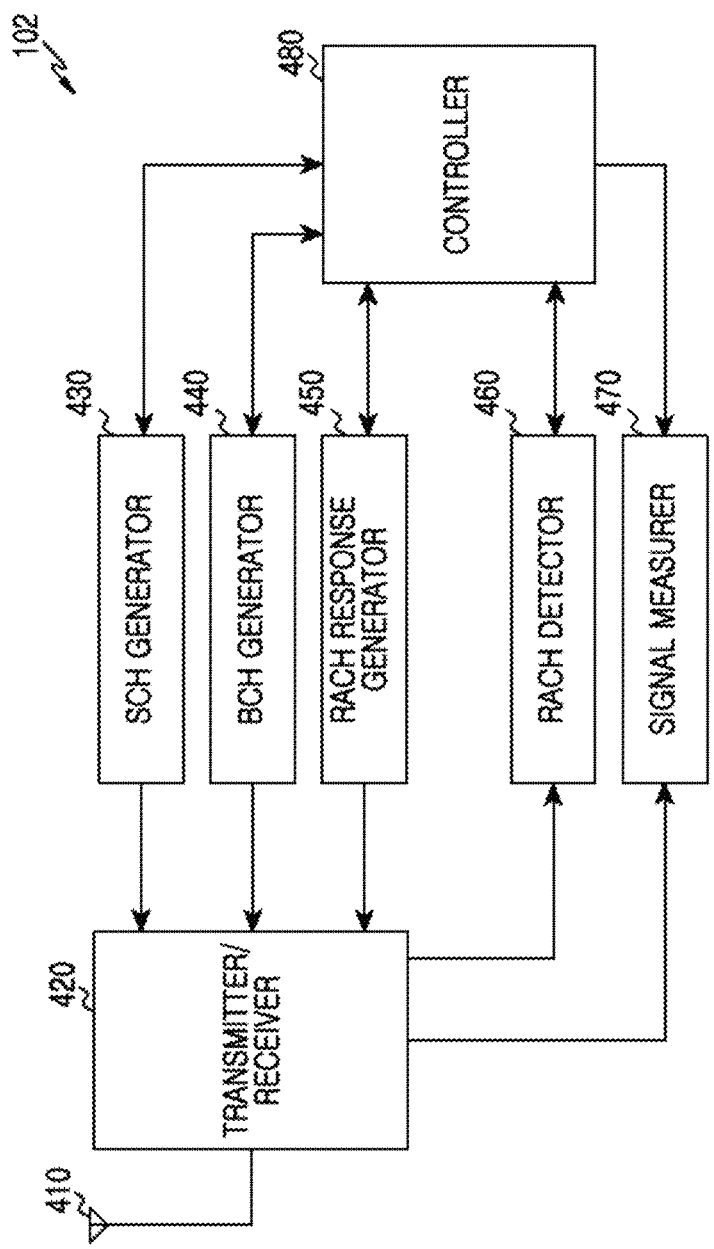
FIG. 4 illustrates a functional diagram of a BS according to embodiments of the present disclosure.

FIG. 4 is a functional diagram illustrating a BS according to embodiments of the present disclosure. Herein, a construction of the BS 102 of FIG. 1 will be described as an example, but it should be noted that this construction is not limited to the BS 102. The construction of the BS 102 is illustrated only in terms of performing a function according to embodiments of the present disclosure. Although performing the same function, the construction of the BS 102 may be illustrated in a different form. It should be noted that the BS 102 can be constructed further including other constituent elements.

The BS 102 includes an antenna 410, a transmitter/receiver 420, a SCH generator 430, a BCH generator 440, a RACH response information generator 450, a RACH detector 460, a signal measurer 470, and a controller 480.

The antenna 410 supports beamforming, and receives a signal from the SS 116, and transmits a signal that is to be transmitted to the SS 116. The transmitter/receiver 420 processes information for transmission into a signal suitable for transmission, and outputs the signal to the antenna 410. The transmitter/receiver 420 processes the information for transmission through encoding, multiplexing and the like to generate a baseband or Intermediate Frequency (IF) signal, and also up converts the baseband or IF signal into an RF signal. The information for transmission can be SCH information generated by the SCH generator 430, BCH information generated by the BCH generator 440, or RACH response information generated by the RACH response information generator 450. The BCH information can include RACH configuration information. The RACH response information can include indication information indicating a best uplink transmission beam.

The transmitter/receiver 420 processes a signal received through the antenna 410. The transmitter/receiver 420 processes to convert an RF signal received through the antenna 410 into a baseband or IF signal, and also processes the baseband or IF signal through filtering, decoding and the like to generate a baseband signal. The RACH detector 460 detects an RACH sequence and best downlink transmission beam indication information from RACH information that is received from the transmitter/receiver 420. The signal measurer 470 measures strength of a signal received by the transmitter/receiver 420. For example, the signal measurer 470 measures a strength of a signal received through a random access channel. That is, the signal measurer 470 can measure a best uplink transmission/reception beam.

The controller 480 can be realized by one or more microprocessors, and controls the general operation according to embodiments of the present disclosure. The controller 480 can be coupled with a memory (not shown). The memory can store RACH configuration information which is provided to the SS 116 at operation according to embodiments of the present disclosure. The RACH configuration information is used for operation of reception and detection of RACH information from the SS 116. More particularly, the controller 480 controls operations of the SCH generator 430, the BCH generator 440, and the RACH response information generator 450. The controller 480 controls operations of the RACH detector 460 and the signal measurer 470. In addition to this, the controller 480 controls an operation of reception of RACH information according to embodiments of the present disclosure. Herein, although a description has been made in which receiving the RACH information according to embodiments of the present disclosure is performed by various constituent elements, this operation or reception can be performed by the single controller 480.

The construction of the BS 102 of FIG. 4 corresponds to the procedure of FIG. 3A, and the construction of the BS 102 of FIG. 4 can be modified corresponding to the procedure of FIG. 3B. For example, a constituent element for generating a beam-measurable reference signal can be a reference signal generator in place of the SCH generator 430.

Figure 5:
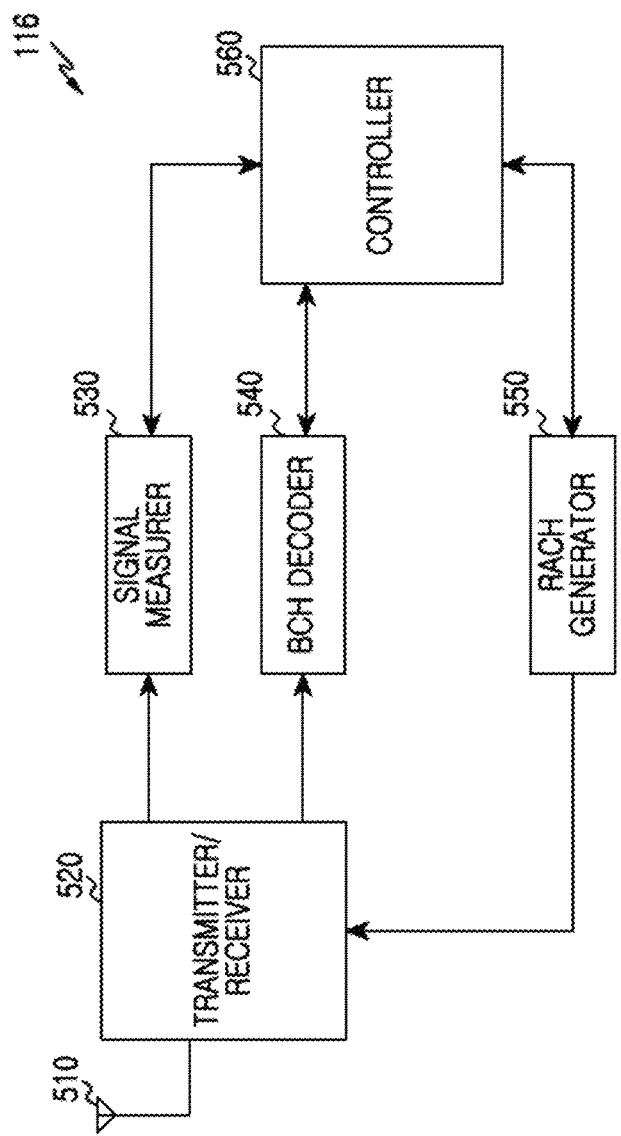
FIG. 5 illustrates a functional diagram of a SS according to embodiments of the present disclosure.

FIG. 5 illustrates a functional diagram of a SS according to embodiments of the present disclosure. Herein, a construction of the SS 116 of FIG. 1 is described as an example, but it should be noted that this construction is not limited to the SS 116. The construction of the SS 116 is illustrated only in terms of performing functions according to embodiments of the present disclosure. Though performing the same function, the construction of the SS 116 may be illustrated in a different form. It should be noted that the SS 116 can be constructed further including other constituent elements.

The SS 116 includes an antenna 510, a transmitter/receiver 520, a signal measurer 530, a BCH decoder 540, an RACH information generator 550, and a controller 560.

The antenna 510 supports beamforming, and receives a signal from the BS 102 and transmits a signal that is to be transmitted to the BS 102. The transmitter/receiver 520 processes a signal received through the antenna 510. The transmitter/receiver 520 converts a RF signal received through the antenna 510 into a baseband or IF signal, and also processes the baseband or IF signal through filtering, decoding, and the like to generate a baseband signal. The signal measurer 530 measures strength of a signal received by the transmitter/receiver 520. For example, the signal measurer 530 measures strength of a signal received through a beam-measurable reference channel such as a synchronization channel. That is, the signal measurer 530 can measure a best downlink transmission/reception beam. The BCH decoder 540 decodes a broadcast channel signal received by the transmitter/receiver 520. For example, RACH configuration information included in BCH information is decoded by the BCH decoder 540.

The transmitter/receiver 520 processes information for transmission into a signal suitable for transmission and outputs the signal to the antenna 510. The transmitter/receiver 520 processes the information for transmission through encoding, multiplexing and the like to generate a baseband or IF signal, and also up converts the baseband or IF signal into a RF signal. The information for transmission can be RACH information generated by the RACH information generator 550. The RACH information includes a RACH sequence and indication information indicating a best downlink transmission beam.

The controller 560 can be implemented as one or more microprocessors, and controls the general operation according to embodiments of the present disclosure. The controller 560 can be coupled to a memory (not shown). The memory can store RACH configuration information which is provided from the BS 102 at operation according to embodiments of the present disclosure. The RACH configuration information is used for operation of transmission of RACH information to the BS 102. In detail, the controller 560 not only controls operations of the signal measurer 530, the BCH decoder 540, and the RACH information generator 550, but also controls an operation of transmission of RACH information according to embodiments of the present disclosure. Herein, an operation of transmission of RACH information according to embodiments of the present disclosure is implemented by various constituent elements, but the operation can be implemented by the single controller 560.

The construction of the SS 116 of FIG. 5 corresponds to the procedure of FIG. 3A, and the construction of the SS 116 of FIG. 5 can be modified corresponding to the procedure of FIG. 3B. For example, the signal measurer 530 measures a received signal strength of a reference signal in place of the synchronization channel signal.

Figure 6:
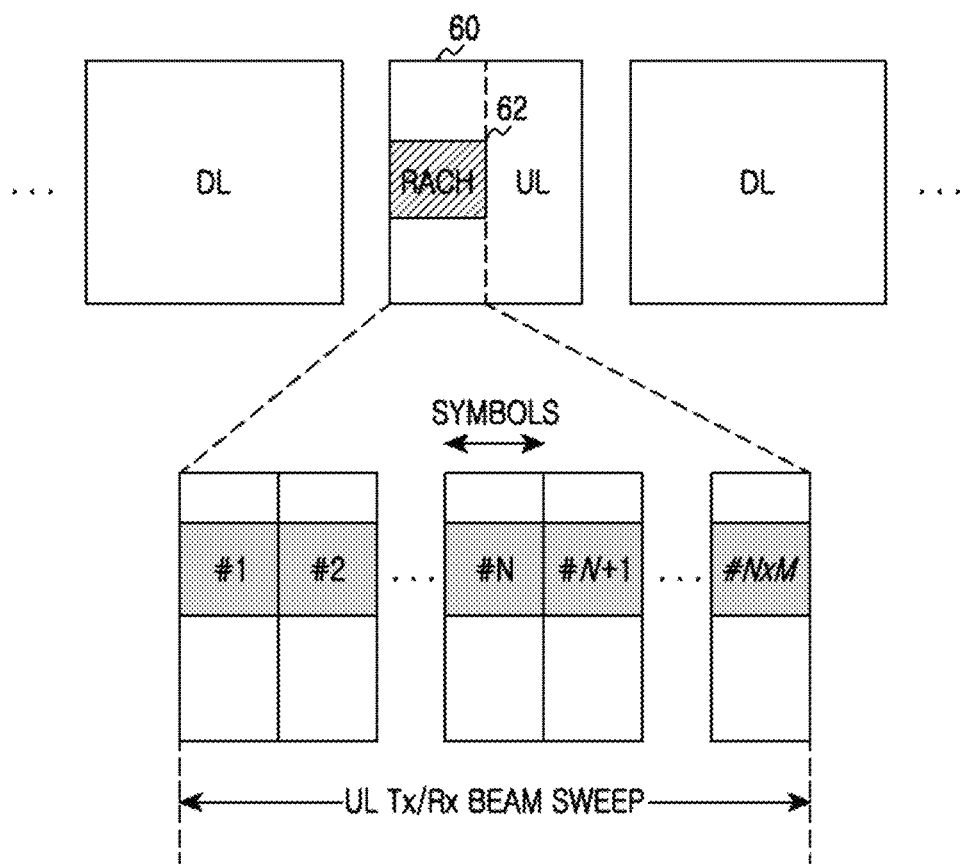
FIG. 6 is a diagram exemplifying a structure of a random access channel according to embodiments of the present disclosure.

FIG. 6 illustrates a structure of a random access channel according to embodiments of the present disclosure. The random access channel (RACH) 62 is transmitted in uplink (UL) 60 from the SS 116 to the BS 102. The structure of the random access channel 62 is an example of a structure for supporting transmission/reception beamforming between the SS 116 and the BS 102 illustrated in FIG. 1. This structure corresponds to a Time Division Duplex (TDD) scheme and, in a case of a Frequency Division Duplex (FDD) scheme, can be modified and illustrated. The SS 116 performs beam sweeping to the BS 102. Herein, 'N' means the number of UL Tx beams, and 'M' means the number of iterative transmission for Rx beamforming support. When transmitting information through the random access channel 62 of the above structure, the SS 116 transmits best downlink beam information, which is selected through a synchronization channel and the like in a previous process, to the BS 102. That is, when the SS 116 has access to a system by using an RACH sequence, the SS 116 transmits the best downlink beam information. For this random access channel transmission operation, the BS 102 provides RACH configuration information associated with the structure of the random access channel, that is, a channel allocation period, a position in time and frequency resources, information about the RACH sequence, and information about 'N' and 'M' values and the like, to the SS 116 through the broadcast channel. And, the SS 116 acquires information necessary for random access channel transmission from the provided RACH configuration information. Based on the acquired information, the SS 116 transmits RACH information. FIG. 6 illustrates a case where the SS 116 performs (N×M) beam sweeping to the BS 102, but a modified example can be used. For example, the modified example can be a method in which the SS 116 fixes an uplink transmission beam and the BS 102 performs reception beam sweeping.

Figure 7:
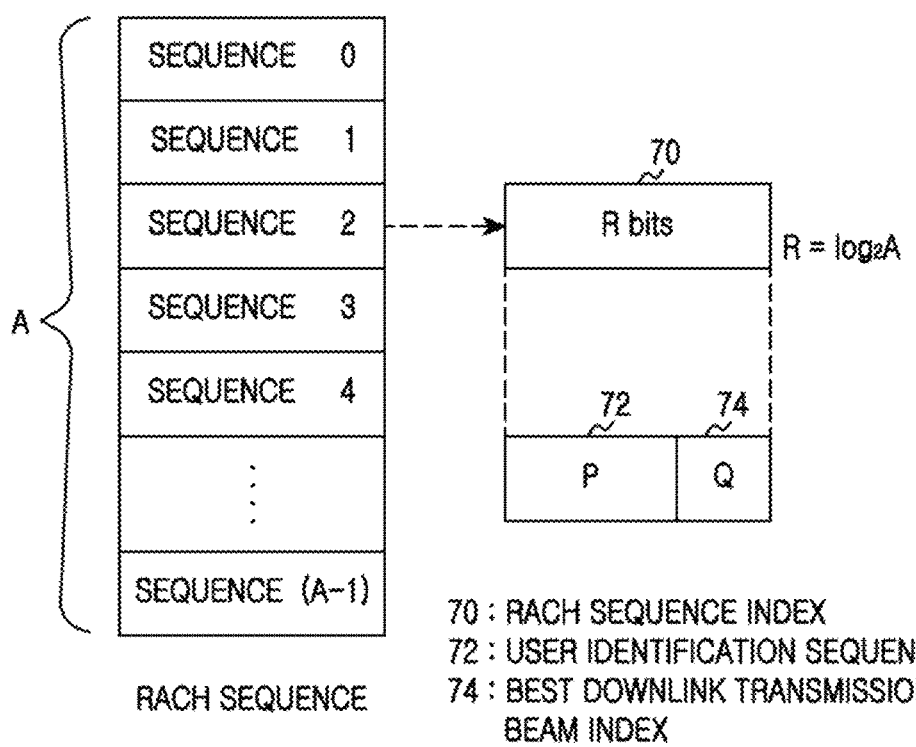
FIG. 7 illustrates an example for describing a Random Access CHannel (RACH) information transmission operation according to embodiments of the present disclosure.

FIG. 7 illustrates an example for describing an RACH information transmission operation according to embodiments of the present disclosure. According to certain embodiments, to transmit best downlink beam information together at RACH sequence transmission, the SS 116 uses a code division method. Assume that the number of RACH sequences is totally 'A' and an index 70 of an RACH sequence is expressed with 'R' bits (R=$\log_2 A$). In the aforementioned assumption, 'P' bit 72 is defined as a user identification sequence index, and 'Q' bit 74 is defined as a best downlink transmission beam index. Here, R=P+Q. The BS 102 transmits the RACH sequences of the total number 'A' and information about 'P' and 'Q', to the SS 116 through a broadcast channel. Thus, the SS 116 acquires the information and, based on the acquired information, the SS 116 has random access to the BS 102. Herein, the information about the 'P' and the 'Q' can be expressed in various forms such as index bit information, sequence grouping configuration and the like. The SS 116 arbitrarily selects one of values of 0 to $2^P-1$ and, in compliance with a predefined rule, the SS 116 combines the selected value with a best downlink transmission beam index (0 to $2^Q-1$) selected using a synchronization channel and the like, and selects one RACH sequence. If the SS 116 transmits the selected RACH sequence to the BS 102, when the BS 102 succeeds in detecting the corresponding RACH sequence, the BS 102 can acquire best downlink transmission beam information of the SS 116 by means of the detected RACH sequence.

The BS 102 detecting a corresponding RACH sequence in a random access channel selects one or more best uplink transmission/reception beam pairs, and transmits an RACH response message by using best downlink transmission beam information received from the SS 116. The RACH response message includes information about a random access success or failure, time and frequency synchronization correction information, best uplink transmission beam information and the like.

According to certain embodiments, the RACH information generator 550 of the SS 116 of FIG. 5 generates RACH information which includes indication information indicating a best downlink transmission beam among downlink transmission beams transmitted from the BS 102. The transmitter 520 transmits the generated RACH information to the BS 102 through the antenna 510.

Under the control of the controller 560, the RACH information generator 550 selects a specific group of RACH sequences indicated by the user identification sequence index 72 among a plurality of RACH sequences, and generates one RACH sequence (for example, sequence 2) as RACH information. The generated RACH sequence (for example, sequence 2) is determined according to the result (namely, the RACH sequence index 70) of combining the selected group of RACH sequences (which is indicated by the user identification sequence index 72) with indication information (namely, the best downlink transmission beam index 74) indicating the best downlink transmission beam. That is, in one example, under the control of the controller 550, the RACH information generator 550 randomly selects the specific group of RACH sequences among the plurality of RACH sequences, searches an RACH sequence indicated (i.e., mapped) by the best downlink transmission beam index 74 within the selected group of RACH sequences, and determines the searched RACH sequence as the one RACH sequence (e.g., sequence 2).

In another example, under the control of the controller 560, the RACH information generator 550 selects a specific group of RACH sequences mapped to the best downlink transmission beam index 74 among a plurality of RACH sequences, randomly selects one RACH sequence (for example, sequence 2) within the specific group of RACH sequences, and generates the selected one RACH sequence (for example, sequence 2) as RACH information.

According to embodiments of the present disclosure, the transmitter/receiver 420 of the BS 102 of FIG. 4 receives RACH information which includes indication information indicating a best downlink transmission beam. The RACH detector 460 detects an RACH sequence and the best downlink transmission beam, from the received RACH information.

Under the control of the controller 480, the RACH detector 460 detects as many bits as a predefined number (i.e., 'P' bit corresponding to the user identification sequence index 72) among RACH information, and detects as a best downlink transmission beam a downlink transmission beam indicated by the remnant bits (i.e., 'Q' bit corresponding to the best downlink transmission beam index 74) excepting the RACH sequence among the RACH information.

According to the aforementioned embodiments, when there is a large amount of information about a best downlink transmission beam (that is, when many bits are necessary for expressing a downlink beam index), a very long RACH sequence is required. This increases complexity in detecting a random access channel in a BS, and puts limitations on designing the random access channel by using given time and frequency resources. Also, if various setting of a downlink transmission beam width is possible in the BS, to support for this various setting causes a huge burden in terms of system design such as designing all RACH sequences for various combinations, designing an RACH sequence according to a minimum beam width and the like.

Figure 8A:
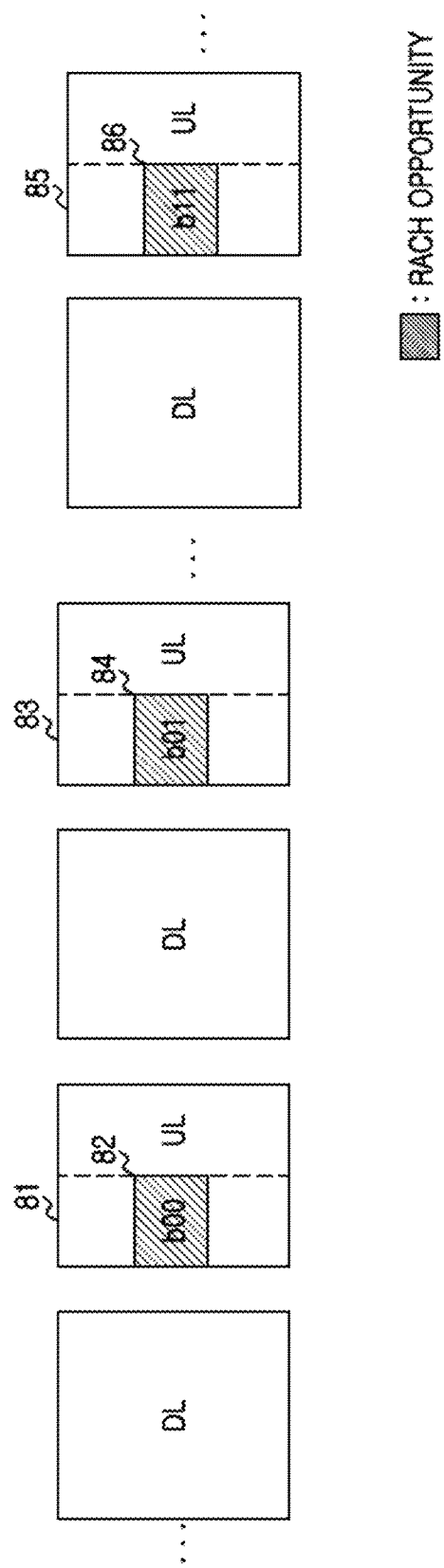
FIGS. 8A and 8B illustrate examples for describing a RACH information transmission operation according to embodiments of the present disclosure.
Figure 8B:
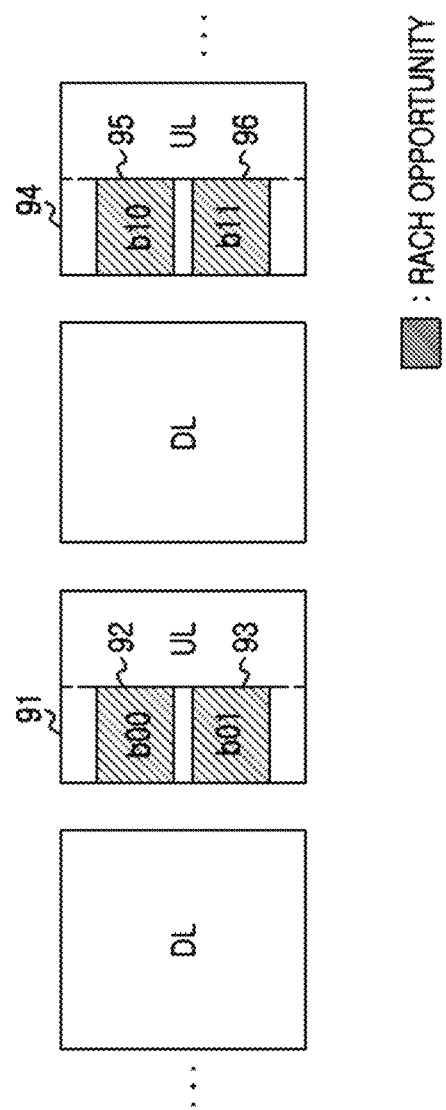

Certain embodiments are for solving the limitations of other embodiments of the present disclosure, and the like, and proposes a way of loading best downlink transmission beam information by using a random access channel position or opportunity. FIGS. 8A and 8B are diagrams for describing an RACH information transmission operation according to certain embodiments of the present disclosure.

For example, when a best downlink transmission beam index is expressed with two bits, an available RACH opportunity of the SS 116 is restricted in association with the best downlink transmission beam index as in FIG. 8A. That is, assuming that a best downlink transmission beam index measured and selected using a synchronization channel, and the like of the SS 116 is given "b00" 82, the SS 116 transmits an RACH sequence 82 to the BS 102 at an RACH opportunity corresponding to the "b00". Thus, the BS 102 interprets "b00" as the best downlink transmission beam index of the SS 116 transmitted at the RACH opportunity corresponding to the "b00," thereby acquiring best downlink transmission beam information. For the sake of this operation, the BS 102 transmits mapping information between the RACH opportunity (depicted in FIG. 8A by hatching) and the best downlink transmission beam index, information about a sequence of each RACH opportunity and the like, to the SS 116 through a broadcast channel. Thus, the SS 116 acquires RACH configuration information transmitted from the BS 102, and has random access to the BS 102 based on the acquired RACH configuration information.

As illustrated in FIG. 8A, the RACH opportunity is a transmission opportunity on the time axis. The best downlink transmission beam index "b00" 82 corresponds to an uplink RACH transmission opportunity 81, and a best downlink transmission beam index "b01" 84 corresponds to an uplink RACH transmission opportunity 83, and a best downlink transmission beam index "b11" 86 corresponds to an uplink RACH transmission opportunity 85.

As illustrated in FIG. 8B, the RACH opportunity is a transmission opportunity on frequency axis. A best downlink transmission beam index "b00" 92 and a best downlink transmission beam index "b01" 93 can correspond to an uplink RACH transmission opportunity 91, and a best downlink transmission beam index "b10" 95 and a best downlink transmission beam index "b11" 96 can correspond to an uplink RACH transmission opportunity 94.

In another way, the RACH opportunity can be distinguished as a combination of time axis and frequency axis. The period of the RACH opportunity can be set differently according to a mapped best downlink transmission beam index.

The BS 102 detecting a corresponding RACH sequence in a random access channel selects one or more best uplink transmission/reception beam pairs, and transmits an RACH response message by using best downlink transmission beam information received from the SS 116. The RACH response message includes information about a random access success or failure, time and frequency synchronization correction information, best uplink transmission beam information and the like.

According to certain embodiments, the RACH information generator 550 of the SS 116 of FIG. 5 generates RACH information which includes indication information indicating a best downlink transmission beam among downlink transmission beams transmitted from the BS 102. The transmitter 520 transmits the generated RACH information to the BS 102 through the antenna 510.

Under the control of the controller 560, the RACH information generator 550 determines any one RACH sequence among a plurality of RACH sequences, and transmits as RACH information the determined RACH sequence at an opportunity corresponding to a best downlink transmission beam among a plurality of transmission opportunities.

According to certain embodiments of the present disclosure, the transmitter/receiver 420 of the BS 102 of FIG. 4 receives RACH information which includes indication information indicating a best downlink transmission beam. The RACH detector 460 detects an RACH sequence and the best downlink transmission beam, from the received RACH information.

Under the control of the controller 480, the RACH detector 460 detects as an RACH sequence a sequence included in RACH information, and detects as a best downlink transmission beam a downlink transmission beam corresponding to an opportunity at which the RACH information is received among a plurality of transmission opportunities.

Figure 9:
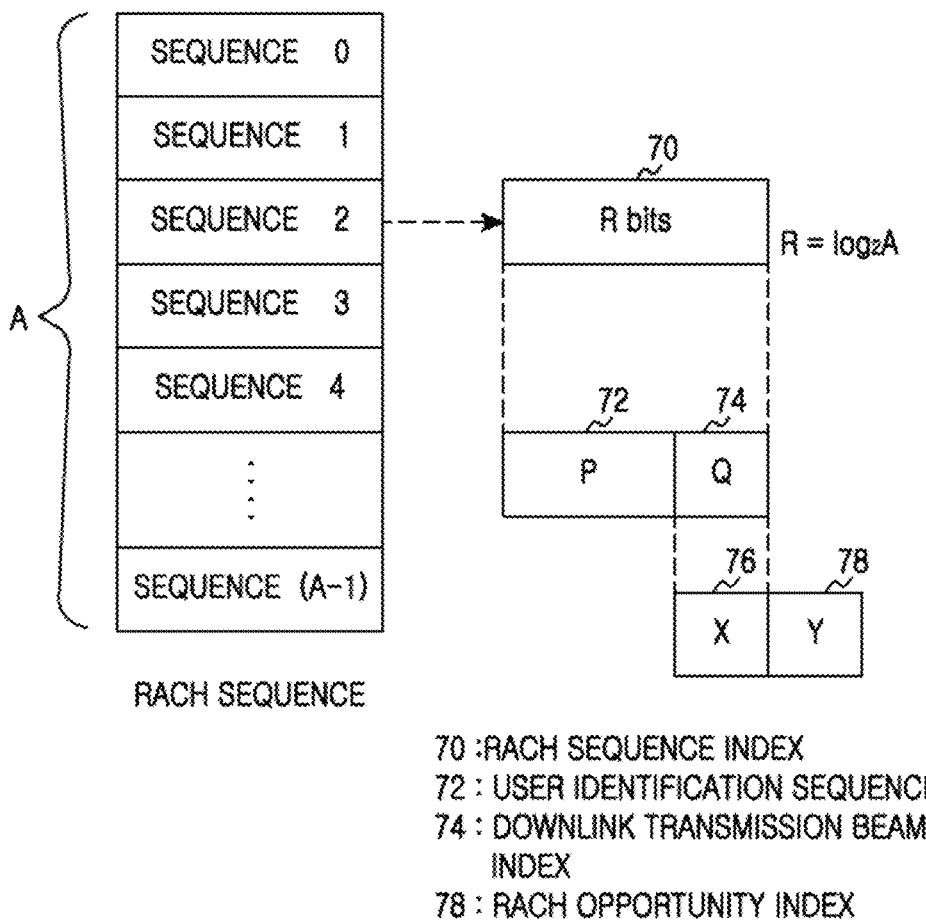
FIG. 9 illustrates an example for describing a RACH information transmission operation according to embodiments of the present disclosure.

A way for the SS 116 to transmit best downlink beam information together at RACH sequence transmission can be combing the way of a first embodiment with a way of a second embodiment. FIG. 9 is a diagram for describing an RACH information transmission operation according to the combination embodiment of the present disclosure.

A best downlink transmission beam index is mapped by 'Q' bit 74 (or 'X' bit 76) and 'Y' bit 78. The 'Q' bit 74 (or 'X' bit 76) are transmitted in a code division method according to embodiments of the present disclosure, and the 'Y' bit 78 are mapped to an RACH opportunity index and are transmitted according to embodiments of the present disclosure. Here, Q=X and R=P+Q. The BS 102 transmits the total number 'A' of RACH sequences of each RACH opportunity, information about 'P' (i.e., a user identification sequence index bit), 'X' and 'Y', and the like to the SS 116 through a broadcast channel. Thus, the SS 116 acquires the information and, based on the acquired information, the SS 116 has random access to the BS 102. The SS 116 arbitrarily selects one of values of 0 to $2^P-1$ and, in compliance with a predefined rule, the SS 116 combines the selected value with a best downlink transmission beam index (0 to $2^X-1$) selected using a synchronization channel and the like, and selects one RACH sequence. Also, the SS 116 transmits the selected RACH sequence to the BS 102 at one RACH opportunity mapped with the 'Y' bit 78. Thus, when the BS 102 succeeds in detecting the corresponding RACH sequence, the BS 102 can acquire the best downlink transmission beam information of the SS 116 by means of the detected RACH sequence.

The BS 102 detecting a corresponding RACH sequence in a random access channel selects one or more best uplink transmission/reception beam pairs, and transmits an RACH response message by using best downlink transmission beam information received from the SS 116. The RACH response message includes information about a random access success or failure, time and frequency synchronization correction information, best uplink transmission beam information and the like.

According to certain embodiments, the RACH information generator 550 of the SS 116 of FIG. 5 generates RACH information which includes indication information indicating a best downlink transmission beam among downlink transmission beams transmitted from the BS 102. The transmitter 520 transmits the generated RACH information to the BS 102 through the antenna 510.

Under the control of the controller 560, at RACH information transmission operation, the RACH information generator 550 selects a specific group of RACH sequences indicated by a user identification sequence index 72 among a plurality of RACH sequences, determines one RACH sequence (e.g., sequence 2) indicated by a transmission beam index 74 in the selected specific group of RACH sequences, and transmits the determined RACH sequence as RACH information at an opportunity (defined by 'Y' bits) selected among a plurality of transmission opportunities. That is, the opportunity selected among the plurality of transmission opportunities and one RACH sequence determined within the specific group of RACH sequences are the indication information indicating the best downlink transmission beam.

In another example, under the control of the controller 560, the RACH information generator 550 selects a specific group of RACH sequences mapped to the downlink transmission beam index 74 among a plurality of RACH sequences, randomly selects one RACH sequence (e.g., sequence 2) within the specific group of RACH sequences, and determines the selected one RACH sequence (e.g., sequence 2). According to certain embodiments of the present disclosure, the transmitter/receiver 420 of the BS 102 of FIG. 4 receives RACH information which includes indication information indicating a best downlink transmission beam. The RACH detector 460 detects an RACH sequence and the best downlink transmission beam, from the received RACH information.

Under the control of the controller 480, the RACH detector 460 detects as many bits as a predefined number (i.e., 'P' bit corresponding to the user identification sequence index 72) among RACH information, and detects as a best downlink transmission beam a downlink transmission beam which corresponds to the remnant some bits (i.e., 'X' bits) excepting the RACH sequence among the RACH information and an opportunity (defined by 'Y' bits) at which the RACH information is received among a plurality of transmission opportunities.

Figure 10A:
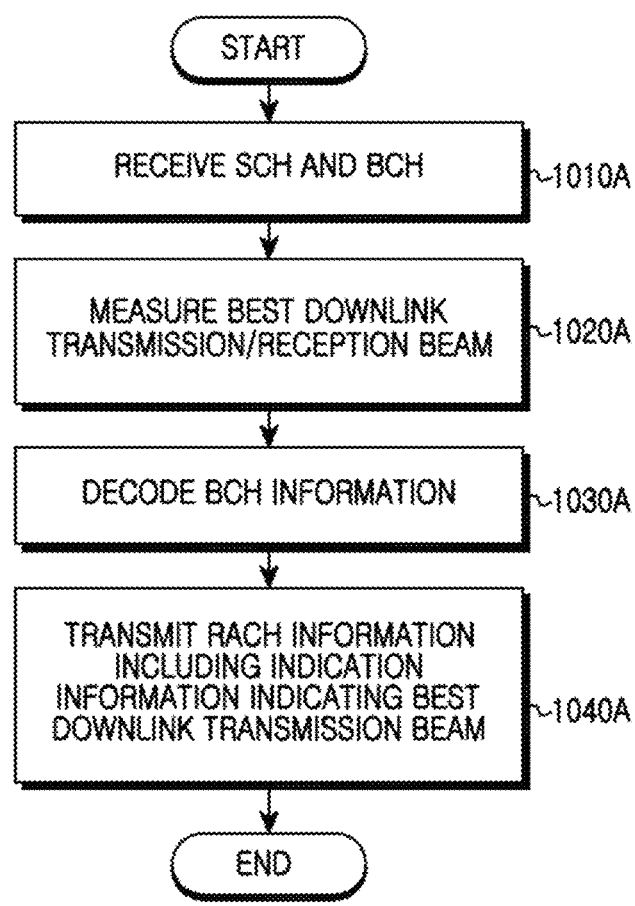
FIGS. 10A and 10B illustrate a procedure of an RACH information transmission operation of a SS according to embodiments of the present disclosure.

FIG. 10A illustrates an example of an RACH information transmission process of a SS according to embodiments of the present disclosure. This operation corresponds to the flowchart of FIG. 3A, and can be carried out by constituent elements illustrated in FIG. 5.

Referring to FIG. 10A, the SS receives an SCH and a BCH from a BS in block 1010A. Next, by measuring the received SCH, the SS measures a best downlink transmission/reception beam among downlink transmission beams transmitted from the BS in block 1020A. In block 1030A, the SS decodes information of the received BCH. From the decoded BCH information, RACH configuration information is acquired. After that, the SS generates RACH information including indication information indicating the best downlink transmission beam and transmits the generated RACH information to the BS (in block 1040A). An operation of generating the RACH information is carried out on the basis of information (that is, the RACH configuration information) discussed earlier with reference to the BS. For example, any one of the embodiments of the present disclosure can be used.

Figure 10B:
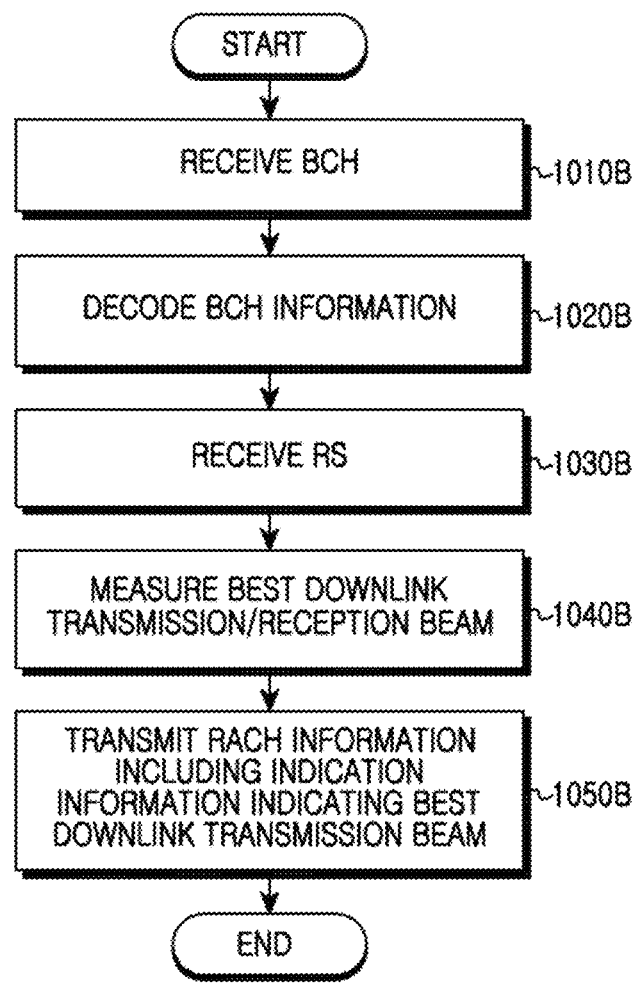

FIG. 10B illustrates another example of an RACH information transmission process of a SS according to embodiments of the present disclosure. This operation corresponds to the flowchart of FIG. 3A, and can be carried out by constituent elements illustrated in FIG. 5.

Referring to FIG. 10B, the SS receives a BCH from a BS (in block 1010B), and decodes information of the received BCH (in block 1020B). From the decoded BCH information, RACH configuration information is acquired. Next, the SS receives a reference signal (RS) (in block 1030B) and, by measuring the received RS, the SS measures a best downlink transmission/reception beam among downlink transmission beams transmitted from the BS (in block 1040B). After that, the SS generates RACH information including indication information indicating the best downlink transmission beam and transmits the generated RACH information to the BS (in block 1050B). Generating the RACH information is carried out on the basis of information (namely, the RACH configuration information) discussed earlier with reference to the BS. For example, any one of the embodiments of the present disclosure can be used.

Figure 11:
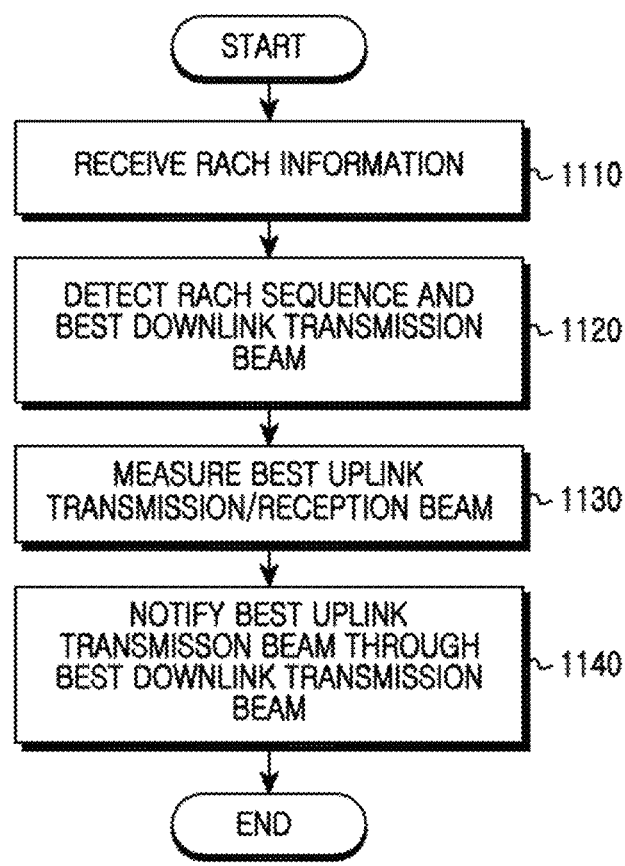
FIG. 11 illustrates a procedure of a RACH information reception operation of a BS according to embodiments of the present disclosure.

FIG. 11 illustrates a procedure of an RACH information reception operation of a BS according to embodiments of the present disclosure. This operation can be carried out by constituent elements similar to those in FIG. 4.

Referring to FIG. 11, the BS receives RACH information which includes indication information indicating a best downlink transmission beam among downlink transmission beams transmitted to a SS from the BS in block 1110. Next, in block 1120, the BS detects an RACH sequence and the best downlink transmission beam from the received RACH information. After that, in block 1130, the BS measures the best uplink transmission/reception beam, and in block 1140, the BS notifies a best uplink transmission beam to the SS through the measured best downlink transmission beam. An operation of receiving and detecting the RACH information is carried out on the basis of information (namely, the RACH configuration information) earlier discussed with the BS. For example, any one of the embodiments of the present disclosure can be used.

As described above, embodiments of the present disclosure have an effect capable of supporting a beam selection process required in a beamforming technology, by enabling a SS to transmit best downlink beam information to a BS, not through a separate channel, but through a random access channel at the time of network entry process in a wireless communication system using beamforming.

While the disclosure includes reference to certain embodiments, it will be understood by those skilled in the art that various changes in form and details may be made therein without departing from the spirit and scope of the invention as defined by the appended claims. For example, in embodiments of the present disclosure, a description has been made for a case where a channel used when measuring a best downlink transmission beam is a synchronization channel, but this does not necessarily intend to limit the scope of protection since a beam measurable reference signal or channel instead of the synchronization channel can be used identically.

For another example, a description has been made in which embodiments of the present disclosure are implemented by constituent elements of a BS and a SS each illustrated in FIG. 4 and FIG. 5, but operations according to the embodiments of the present disclosure would be able to be realized by the single controller 560. In this case, a program instruction for performing an operation realized by various computers can be recorded in a computer readable medium. The computer readable medium can include a program instruction, a data file, a data structure and the like alone or in combination. The program instruction can be an instruction specially designed and configured for embodiments of the present disclosure or an instruction well known to those skilled in the art and available. An example of the computer readable recording medium includes a magnetic medium such as a hard disk, a floppy disk, and a magnetic tape, an optical recording medium such as a Compact Disk-Read Only Memory (CD-ROM) or a Digital Versatile Disk (DVD), a magnetic-optical medium such as a floptical disk, and a hardware device specially constructed to store and perform the program instruction such as a Read Only Memory (ROM), a Random Access Memory (RAM), a flash memory and the like. An example of the program instruction includes a mechanical language code such as a code made by a compiler and a high level language code executable by a computer by using an interpreter and the like. If all or part of a BS described in the present disclosure or a relay is realized by a computer program, even a computer readable recording medium storing the computer program is included in the present disclosure. Therefore, the scope of the disclosure should not be limited and defined by the described embodiments, and should be defined by appended claims and equivalents to the claims.

What is claimed is:

1. A method for operating a terminal in a wireless environment, the method comprising:
receiving, from a base station (BS), one or more set of one or more synchronization signal with one or more broadcast signal transmitted via one or more downlink (DL) transmit (Tx) beam;
receiving, from the BS, configuration information indicating a first configured number of at least one set of at least one synchronization signal with at least one broadcast signal transmitted via at least one DL Tx beam mapped to each random access channel (RACH) opportunity, wherein the configuration information further indicates a second configured number of RACH sequences for each DL Tx beam;
determining a RACH opportunity corresponding to a set of a synchronization signal with a broadcast signal transmitted via a DL Tx beam from among the one or more set based on the configuration information; and
transmitting, to the BS, a RACH sequence through the determined RACH opportunity.

2. The method of claim 1, further comprising:
determining a group of RACH sequences corresponding to the DL Tx beam in the determined RACH opportunity based on the first configured number the second configured number; and
determining the RACH sequence among the group of RACH sequences.

3. The method of claim 1, wherein the one or more DL Tx beam corresponds to one or more RACH opportunity, and wherein the one or more RACH opportunities are frequency-multiplexed in a frequency domain.

4. The method of claim 1, wherein the one or more DL Tx beam correspond to one or more RACH opportunity, and wherein the one or more RACH opportunity is time-multiplexed in a time domain.

5. The method of claim 1, further comprising:
receiving, from the BS, information regarding a time-frequency resource of a RACH.

6. The method of claim 1, further comprising:
measuring a signal strength of each of the one or more DL Tx beam; and
determining a DL Tx beam based on the measured signal strength of each of the one or more DL Tx beam.

7. A terminal in a wireless environment comprising:
a transceiver configured to:
- receive, from a base station (BS), one or more set of one or more synchronization signal with one or more broadcast signal transmitted via one or more downlink (DL) transmit (Tx) beam, and
- receive, from the BS, configuration information indicating a first configured number of at least one set of at least one synchronization signal with at least one broadcast signal transmitted via at least one DL Tx beam mapped to each random access channel (RACH) opportunity, wherein the configuration information further indicates a second configured number of RACH sequences for each DL Tx beam; and at least one processor, operably coupled to the transceiver, configured to determine a RACH opportunity corresponding to a set of a synchronization signal with a broadcast signal transmitted via a DL Tx beam from among the one or more set based on the configuration information, wherein the transceiver is further configured to transmit, to the BS, a RACH sequence through the determined RACH opportunity.

8. The terminal of claim 7, wherein the at least one processor is further configured to:
- determine a group of RACH sequences corresponding to the DL Tx beam in the determined RACH opportunity based on the first configured number the second configured number; and
- determine the RACH sequence among the group of RACH sequences.

9. The terminal of claim 7, wherein the one or more DL Tx beam corresponds to one or more RACH opportunity, and
wherein the one or more RACH opportunity is frequency-multiplexed in a frequency domain.

10. The terminal of claim 7, wherein the one or more DL Tx beam corresponds to one or more RACH opportunity, and
wherein the one or more RACH opportunity is time-multiplexed in a time domain.

11. The terminal of claim 7, wherein the transceiver is further configured to:
receive, from the BS, information regarding a time-frequency resource of a RACH.

12. The terminal of claim 7, wherein the at least one processor is further configured to:
- measure a signal strength of each of the one or more DL Tx beam; and
- determine a DL Tx beam based on the measured signal strength of each of the one or more DL Tx beam.

13. A base station (BS) in a wireless environment comprising:
at least one processor; and
a transceiver, operably coupled to the at least one processor, configured to:
- transmit, to a terminal, at least one set of at least one synchronization signal with at least one broadcast signal via at least one downlink (DL) transmit (Tx) beam, and
- receive, from the terminal, a random access channel (RACH) sequence through a RACH opportunity corresponding to a set of a synchronization signal with a broadcast signal, wherein the RACH opportunity is determined based on configuration information indicating a first configured number of at least one set of at least one synchronization signal with at least one broadcast signal transmitted via at least one DL Tx beam mapped to each RACH opportunity, wherein the configuration information further indicates a second configured number of RACH sequences for each DL Tx beam, and wherein the configuration information is transmitted by the BS through the transceiver to the terminal.

14. The BS of claim 13, wherein a group of RACH sequences corresponding to the DL Tx beam in the RACH opportunity is determined based on the first configured number and the second configured number, and
wherein the RACH sequence is determined among the group of RACH sequences.

15. The BS of claim 13, wherein the at least one DL Tx beam corresponds to at least one RACH opportunity, and
wherein the at least one RACH opportunity is frequency-multiplexed in a frequency domain.

16. The BS of claim 13, wherein the at least one DL Tx beam corresponds to at least one RACH opportunity, and
wherein the at least one RACH opportunity is time-multiplexed in a time domain.

17. The BS of claim 13, wherein the transceiver is further configured to:
transmit, to the terminal, information regarding a time-frequency resource of a RACH.

* * * * *